United States Patent

[11] 3,602,833

[72] Inventor William E. Barnette
Levittown, Pa.
[21] Appl. No. 860,353
[22] Filed Sept. 23, 1969
[45] Patented Aug. 31, 1971
[73] Assignee The United States of America as represented by the Secretary of the Navy

[54] ACTIVE TWIN T FILTER WITH A POSITIVE FEEDBACK Q CONTROL
1 Claim, 2 Drawing Figs.

[52] U.S. Cl. 330/104, 330/108, 330/109
[51] Int. Cl. H03f 1/36
[50] Field of Search 330/21, 31, 69, 38 M, 103, 104, 107, 108, 109, 30, 30 D; 331/110, 142

[56] References Cited

UNITED STATES PATENTS 3,356,962 12/1967 Morgan 330/107

FOREIGN PATENTS 157,033 11/1951 Australia 330/109

OTHER REFERENCES

Butler, " Transistor R-C Oscillators and Selective Amplifiers" Wireless World December 1962 , pp. 583- 589 331- — 110

Dahlem, " Industrial Applications of Linear ICs," The Electronic Engineer, June 1967, pp. 72- 77 330-30 D

*Primary Examiner*—Roy Lake
*Assistant Examiner*—James B. Mullins
*Attorneys*—Joseph C. Warfield and John W. Pease

ABSTRACT: An active twin T filter in which current is drawn from an amplifier or from the legs of a twin T network and passed as feedback to the positive input side of the amplifier to provide Q control and the combination thereof with the passage of feedback current from the network to the negative input of the amplifier to provide frequency control, both controls being obtained without need to vary the passive resistor and capacitor elements of the circuit.

PATENTED AUG 31 1971 3,602,833

WILLIAM E. BARNETTE
INVENTOR.

BY John M. Pease
Attorney

ACTIVE TWIN T FILTER WITH A POSITIVE FEEDBACK Q CONTROL

BACKGROUND OF THE INVENTION

This invention relates to notch filters in which an arrangement of electronic components is designed to attenuate or reject a specific frequency band with sharp cutoff at either end and more particularly to twin T-notch filters in which a tuned circuit at the output of a highly selective amplifier is made adjustable to vary the frequency and Q of the filter circuit.

In this field it is well-known to employ a twin T-notch filter as a negative feedback element of an amplifier. The reduction of negative feedback at the notch frequency produces the inverse of the notch in the output. This circuit combination produces a band-pass filter in which the Q and frequency can be adjusted by changing the values of the passive resistance and capacitor elements of the twin T network. In the design of a high Q narrow band twin T filter, the accuracy of both frequency and Q depends upon the measured accuracy of the calculated resistance and capacitor components of the twin T network. If it is desired to change either the frequency or Q, the elements of the twin T network must be recalculated.

It is also known that the frequency of a twin T filter can be adjusted without changing the passive elements value in the twin T network by using a method of unbalancing the feedback drive to each half of the twin T network. This method, however, produces variation in the Q of the filter.

SUMMARY OF THE INVENTION

In the subject invention adjustable potentiometer means are provided to effect an adjustable positive feedback to the amplifier of the circuit such that the value of Q may be adjusted without need to vary the passive elements of the twin T-network, the positive feedback being derived from the output of the amplifier or from the legs of the twin T-network. Thus, if a filter design calls for a certain Q value, the circuit passive components can be calculated on the basis of a lower Q and then the amount of positive feedback can be adjusted to increase the Q to the exact desired value. This invention also contemplates the combination of negative and positive feedback to the amplifier to provide a combination of frequency and Q control to provide a flexible, versatile filter circuit.

DESCRIPTION OF THE PREFERRED EMBODIMENTS

Figure 1:
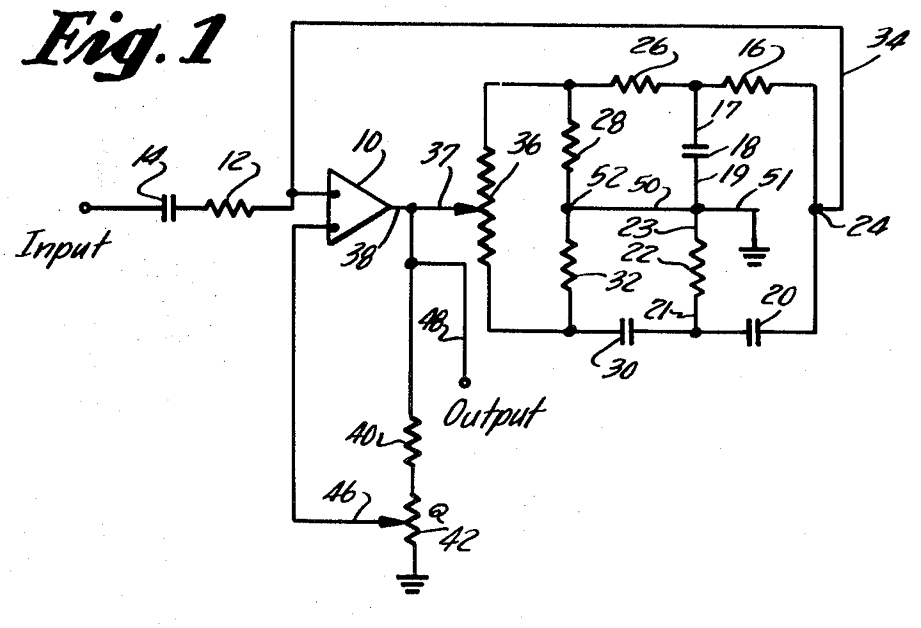
FIG. 1 is a circuit diagram schematically illustrating a filter circuit incorporating the invention and in which provision is made for both negative and positive feedback currents, the positive feedback current being derived from the output of an amplifier.

Referring to FIG. 1 the filter circuit shown therein comprises a differential amplifier 10 and a twin T network. The twin T network includes one T network comprising the series-connected resistors 16 and 26 and the capacitor 18, a second T network comprising the series-connected capacitors 20 and 30 and a resistor 22, together with series-connected balancing resistors 28 and 32 connected respectively to the resistor 26 and capacitor 30. A common point 52 of resistors 28 and 32 is connected by lines 50 and 51 to ground indicated. The capacitor 18 and lines 17 and 19 forming the leg of the first half of the twin T network is connected to ground indicated by the line 51. The resistor 22 and lines 21 and 23 forming the leg of the other half of twin T network is connected through line 51 to ground.

The output of the twin T network is connected from point 24 by line 34 to the negative input side of the amplifier 10, and an adjustable potentiometer 36 is connected by lines 37 and 38 to the output of the amplifier 10 to unbalance the feedback drive to each half of said twin T network and thereby provide for varying the frequency of the filter circuit.

Continuing with F FIG. 1 there is added in accordance with my invention potentiometer means for passing to the positive side of the amplifier 10 a feedback current derived from the output of the amplifier 10. Thus, I provide a resistor 40 and potentiometer 42 connected by lines 44 and 38 to the output side of the amplifier 10 and by line 46 to the positive input side, indicated, of the amplifier 10. The output current of the filter circuit is carried on line 48 connected to line 44.

The advantage of the above described circuit is that by providing the positive feedback circuit arrangement the filter circuit is made adjustable for Q value without recalculation and modification of the passive resistor and capacitor elements. Further, in combination with the features of negative feedback a new circuit is developed which provides adjustment of both frequency and Q values without recalculation and modification of the passive resistance and capacitor elements of the twin T network.

Figure 2:
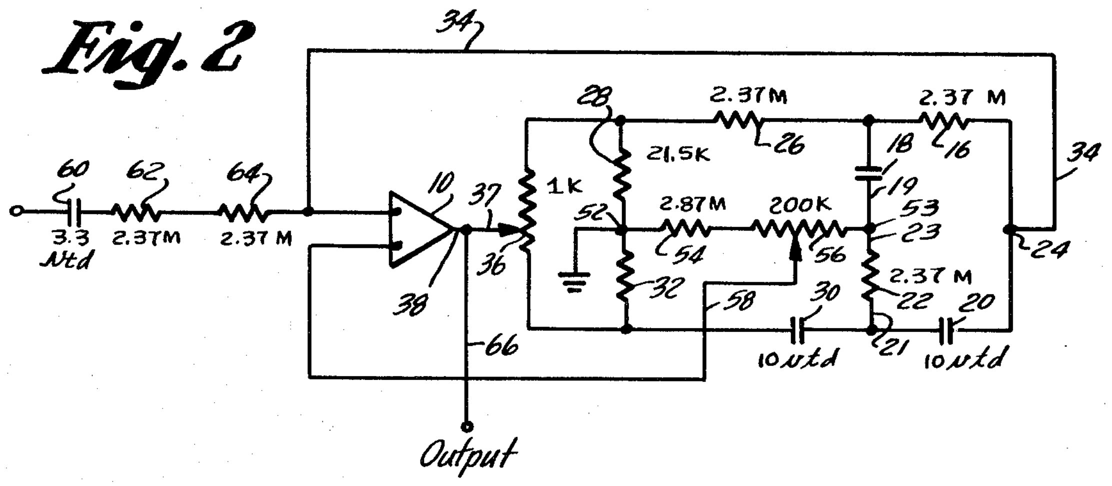
FIG. 2 is a circuit diagram schematically illustrating a modification of the invention in which negative and positive feedback is obtained and in which the positive feedback is derived from the current in the legs of the twin T network.

In FIG. 2 is shown a modification of my invention in which the positive feedback current is derived from the current in the legs of the twin T network. Thus, there is connected between a point 53, located between the resistor 22 and capacitor 18, and the point 52, located between resistors 28 and 32, potentiometer means including a resistor 54 and potentiometer 56. Point 52 is connected to ground indicated. The output from potentiometer 56 is connected on line 58 to the positive input side, indicated, of the amplifier 10. The remaining elements constituting the T networks and the balancing resistors remain identical to the circuit of FIG. 1 and for convenience and simplicity the same numbering is retained. A modified input coupling which includes a capacitor 60 and resistors 62 and 64 are connected in series between an activating current source, indicated, and the negative input side of the amplifier 10. Output of the filter of FIG. 2 is taken from line 66 connected to output line 38 of amplifier 10.

The modified form of my invention illustrated in FIG. 2 incorporates the same advantages as recited above for the circuit of FIG. 1.

In summation, in accordance with my invention, the provision of means providing an adjustable positive feedback current provides the advantage that by increasing this positive feedback current, the Q of the circuit can be increased up to the point where the circuit becomes unstable and self-oscillation occurs. If a filter design calls for a certain Q value, the circuit passive components of resistance and capacitance can be calculated on the basis of a lower Q than is desired and then the amount of positive feedback can be adjusted to increase the Q factor to the exact desired value. Moreover, by combining the above with means for providing a negative feedback, a combination of frequency and Q control is provided which makes the filter circuit quite versatile. In addition a variable Q filter can also be built following my invention. That is, a very low Q twin T filter can be designed. The designed Q becomes the minimum Q of the filter. The positive feedback Q control then provides a Q increase to a value which is limited by stability factors.

As an example of element values, the elements of the circuit of FIG. 2 have been assigned specific values. The Q of the circuit of FIG. 2 without feedback is 1. The positive feedback increases the Q to a required value of 5. An increase in filter gain is associated directly with the increase in Q. A gain of two without positive feedback increases to a final gain of ten with a five time increase in Q.

I claim:

1. An active twin T filter circuit comprising:

a differential amplifier having an output connection and positive and negative input connections;

means for applying input signals to said negative input connection;

a twin T network comprising a first T network including a capacitor as a center leg leading from between two series connected resistors, a second T network including a resistor as a center leg leading from between two series connected capacitors, said center legs being connected to form a junction therebetween, and resistive means connecting said junction to ground;

means for connecting said series-connected capacitors in parallel with said series-connected resistors between said output connection of said differential amplifier and said negative input connection thereof; and said resistive means comprising a potentiometer having its wiper connected to said positive input connection whereby a positive feedback signal is derived from the current in said legs, which signal can be selectively varied by adjustment of said wiper without affecting the balance of said twin T network.